(12) United States Patent
Khan et al.

(10) Patent No.: US 8,593,088 B2
(45) Date of Patent: Nov. 26, 2013

(54) METHOD AND SYSTEM FOR CONTROLLING AN ELECTRIC MOTOR FOR A VEHICLE

(75) Inventors: Ahmad Khan, Rochester Hills, MI (US); Jonathan M. Sibley, Auburn HIlls, MI (US); Bing Cheng, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 180 days.

(21) Appl. No.: 13/350,211

(22) Filed: Jan. 13, 2012

(65) Prior Publication Data

US 2013/0181642 A1 Jul. 18, 2013

(51) Int. Cl.
*H02P 21/14* (2006.01)

(52) U.S. Cl.
USPC ............... 318/400.02; 318/400.11; 318/432; 318/490; 700/287; 700/297

(58) Field of Classification Search
USPC ............... 318/400.02, 400.11, 432, 490, 712; 700/287, 297
See application file for complete search history.

(56) References Cited

U.S. PATENT DOCUMENTS

| | | | |
|---|---|---|---|
| 6,936,991 B2* | 8/2005 | Chen et al. | 318/700 |
| 7,659,685 B2* | 2/2010 | Cesario et al. | 318/712 |
| 7,956,637 B2* | 6/2011 | Lu et al. | 324/765.01 |
| 8,410,737 B2* | 4/2013 | Wu et al. | 318/400.11 |
| 2004/0036434 A1* | 2/2004 | Chen et al. | 318/432 |
| 2009/0051308 A1* | 2/2009 | Lu et al. | 318/490 |
| 2011/0213589 A1* | 9/2011 | Lu et al. | 702/182 |
| 2011/0257799 A1* | 10/2011 | Al-Hamouz et al. | 700/287 |
| 2011/0257800 A1* | 10/2011 | Al-Hamouz et al. | 700/287 |
| 2012/0217916 A1* | 8/2012 | Wu et al. | 318/400.11 |
| 2012/0259477 A1* | 10/2012 | Abido et al. | 700/297 |

* cited by examiner

*Primary Examiner* — Paul Ip
(74) *Attorney, Agent, or Firm* — Frederick A. Krieger

(57) ABSTRACT

A system and method for calibrating an interior permanent magnet (IPM) motor with an optimized maximum torque per ampere trajectory curve. The system and method use a real-time particle swarm technique that requires less known parameters than standard maximum torque per ampere trajectory techniques.

15 Claims, 4 Drawing Sheets

METHOD AND SYSTEM FOR CONTROLLING AN ELECTRIC MOTOR FOR A VEHICLE

FIELD

The present disclosure relates to the field of hybrid electric vehicles (HEV) and battery electric vehicles (BEV), and more particularly to a method and system for automated maximum torque per ampere trajectory generation for interior permanent magnet (IPM) motors used in said vehicles.

BACKGROUND

Permanent magnet synchronous motors (PMSM) are widely used in hybrid electric vehicles and battery electric vehicles. Among the permanent magnet synchronous motors, interior permanent magnet (IPM) motors are the most commonly used motors for HEV/BEV applications due to their high power density, high efficiency and wide speed range.

In automotive traction applications, operating an IPM motor at its maximum efficiency is necessary to maximize the use of the vehicle battery's limited power and energy. This can be achieved by optimizing the motor's control algorithm to provide maximum torque at a minimum motor current value. "Maximum torque per ampere" (MTPA) control algorithms maximize the IPM motor drive torque capability when the motor is operating below its rated speed. The MTPA control algorithms also minimize copper losses, thereby increasing the overall efficiency of the IPM motor (because copper losses are proportional to the square of the current).

Proper selection of the current vector is needed to develop an MTPA control algorithm. Referring to FIG. 1, the current vector is represented by the current magnitude 'I' and the current phase angle 'α' or, equivalently, by the d-axis current 'Id' and the q-axis current 'Iq' (in the Id-Iq axis plane). The current phase angle α is measured with respect to the positive Iq-axis in a counterclockwise direction with the d-axis current Id being equal to $-I*\mathrm{Sin}(\alpha)$ and the q-axis current Iq being equal to $I*\mathrm{Cos}(\alpha)$.

The torque of an interior permanent magnet motor is defined as:

$$T = \frac{3P}{2} * [\Phi_{mag} * I * \mathrm{Cos}(\alpha) + (Lq - Ld) * I^2 * \mathrm{Sin}(\alpha) * \mathrm{Cos}(\alpha)] \quad (1)$$

Where P is the rotor pole pairs of the motor; $\Phi_{mag}$ is the permanent magnet flux; Ld is the d-axis inductance; and Lq is the q-axis inductance. The first term in Equation (1) represents the magnet torque and the second term represents the reluctance torque due to saliency (i.e., the difference between the d-axis and q-axis inductances).

To find the maximum torque per ampere, Equation (1) is differentiated with respect to the current and equated to zero. The optimal value of the current phase angle α at which the torque per current I becomes maximum is given below in Equation (2):

$$\alpha = \sin^{-1}\left[\frac{-\phi_{mag} + \sqrt{(\phi_{mag})^2 + 8*(Ld-Lq)^2*I^2}}{4*(Ld-Lq)*I}\right] \quad (2)$$

Where Ld and Lq vary depending on the phase angle α and the current magnitude I.

The MTPA trajectory is shown in FIG. 1. The MTPA trajectory points (I, α) correspond to the intersection between the constant current circles and the constant torque loci (given by Equation 1). The trajectory points P1, P2 and P3 correspond to the optimal operating points for torques T1, T2, T3. FIG. 1 illustrates one set of points (I, α), (Id, Iq) that correspond to point P1. It should be appreciated that there are points (I, α), (Id, Iq) that correspond to points P2 and P3 as well.

Generally, to use the MTPA algorithm described above, specific knowledge of three motor parameters is required (see Equation (2) above). These parameters are the d-axis inductance (Ld), q-axis inductance (Lq) and permanent magnet flux ($\Phi_{mag}$). The relationship between the torque and motor currents in IPM motors, however, is non-linear (see Equation (1) above). Thus, any error in the estimation and computation of machine parameters will affect the control performance, resulting in less efficiency. Motor manufacturers do not provide operating range values for these parameters; even if they were provided, the parameters would only represent one operating point, which is not enough to optimize the control algorithm. The d-axis inductance (Ld), q-axis inductance (Lq) and permanent magnet flux ($\Phi_{mag}$) parameters are non-linear and vary significantly as the machine is loaded; this presents a significant challenge in determining the minimum current magnitude for a given torque command.

Moreover, most of today's current IPM control schemes have additional shortcomings. For example, current online MTPA schemes are based on the injection of an additional pulsating current signal superimposed on a fundamental current vector, which causes additional copper losses, noise, vibration, torque pulsation and may cause additional problems in the control process. Most of the current online optimized MTPA schemes are based on derivatives, which are not very efficient and may get stuck in local minima/maxima during the optimization process. In addition, most of today's schemes use offline parameter estimation methods, which are very time consuming, not accurate and may increase control development time. Some of the schemes use online parameter estimation techniques that are computational intensive and become an additional burden on the processor while some parameter estimation schemes need additional hardware (e.g., filters) that may not be available and may increase control development time.

Accordingly, there is a need and desire for an optimized maximum torque per ampere control scheme for an interior permanent magnet motor, such as the IPM motors used in hybrid electric and battery electric vehicles.

SUMMARY

In one form, the present disclosure provides a method of calibrating a motor controller used to control an interior permanent magnet (IPM) motor for a vehicle. The method comprises setting a current magnitude value for a current of the IPM motor; measuring a torque of the IPM motor; determining a maximum torque per ampere trajectory point for the IPM motor based on optimizing a current phase angle using particle swarm optimization; and repeating said current setting step to said maximum torque per ampere trajectory point determining step for a predetermined number of current magnitude values to create a maximum torque per ampere trajectory curve.

The present disclosure also provides a system for calibrating a motor controller used to control an interior permanent magnet (IPM) motor for a vehicle. The system comprises an inverter comprising the motor controller and being connected to control the IPM motor; a dynamometer controller connected to a dynamometer machine; a torque sensor connected between the IPM motor and the dynamometer machine; and a host computer coupled to the inverter. The host computer is programmed to set the current magnitude and a phase angle for a current of the IPM motor; input a measured a torque of the IPM motor from the torque sensor; determine a maximum torque per ampere trajectory point for the IPM motor based on optimizing a current phase angle using a real-time particle swarm optimization; and repeat said current setting step to said maximum torque per ampere trajectory point determining step for a predetermined number of current magnitude values to create a maximum torque per ampere trajectory curve.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

The embodiments disclosed herein provide a method and system for automated maximum torque per ampere trajectory generation to be used for interior permanent magnet (IPM) motors. The disclosed technology converts the MTPA control scheme into an optimization problem that is solved in real-time using a "particle swarm optimization" (PSO) technique (explained in more detail below).

Figure 1:
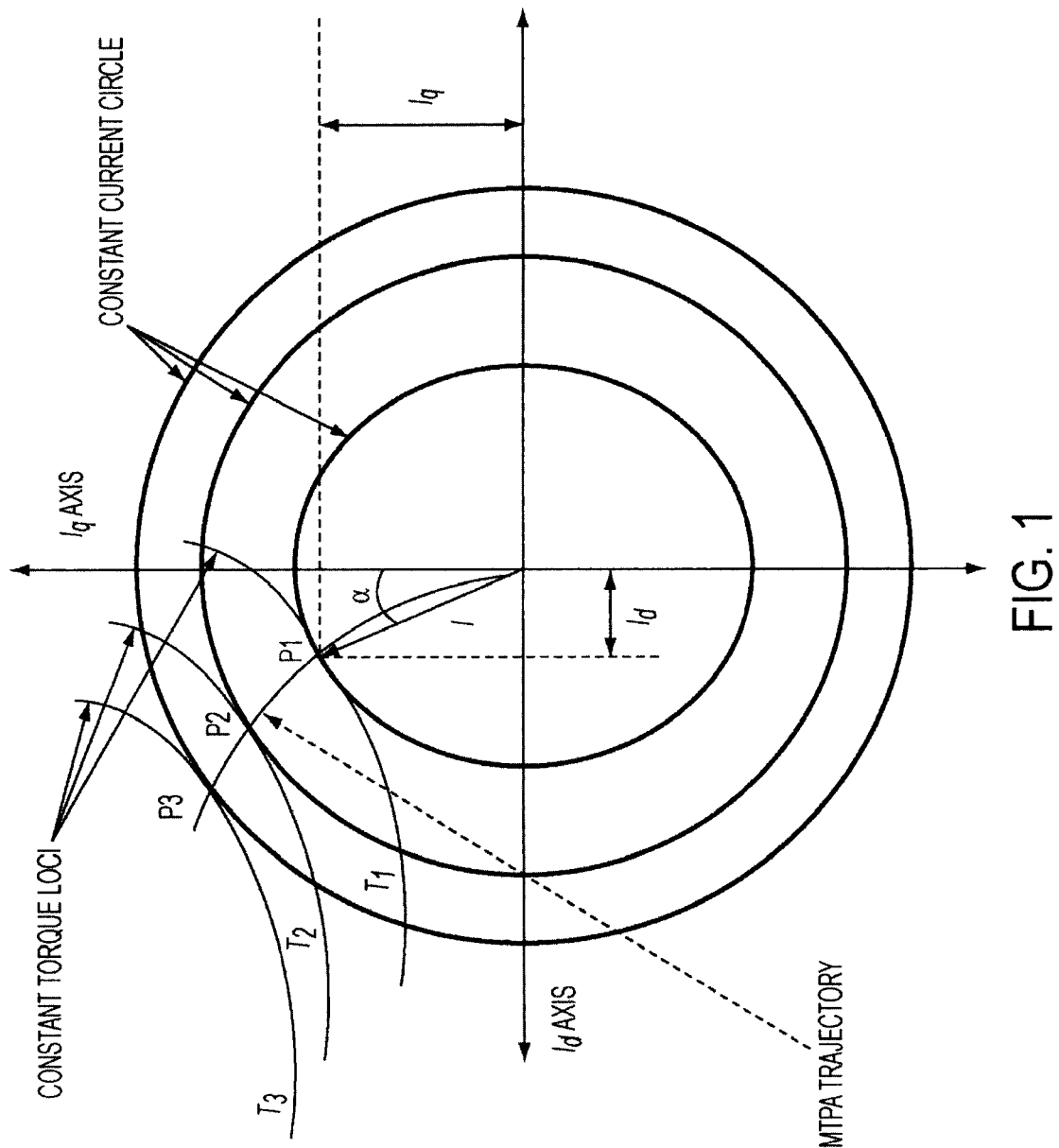
FIG. 1 illustrates an interior permanent magnet motor current Id-Iq operating plane.
Figure 2:
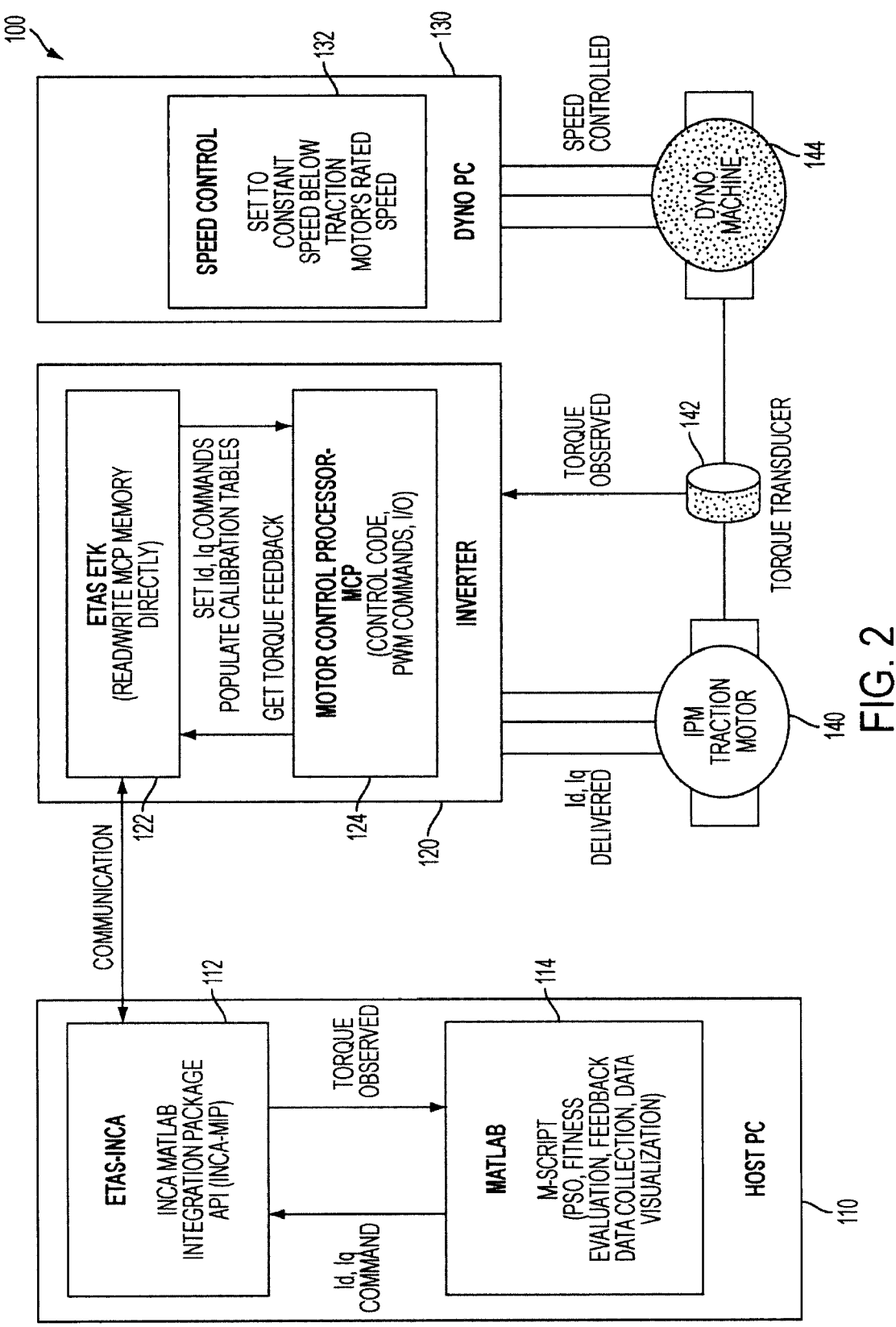
FIG. 2 is a block diagram of a system for automated maximum torque per ampere trajectory generation to be used for interior permanent magnet (IPM) motors in accordance with an embodiment disclosed herein.

The disclosed processing is implemented on a system 100 such as e.g., the one illustrated in FIG. 2. The system 100 includes a host computer ("host PC") 110, an inverter 120, a dynamometer computer ("Dyno PC") 130, an IPM traction motor 140, a torque transducer 142 and a dynamometer machine ("Dyno machine") 144. The IPM traction motor 140 is connected to the torque transducer 142, which is also connected to the Dyno machine 144. In a desired embodiment, the host PC 110 includes an ETAS-INCA MATLAB integration package ("INCA-MIP") 112 that communicates with a MATLAB application/workspace 114. The MATLAB application 114 issues Id and Iq current commands to the INCA-MIP 112 and inputs observed torque from the INCA-MIP 112.

The host PC 110 communicates with the inverter 120 via the INCA-MIP 112 and an ETAS ETK driver 122. The inverter 120 also includes a motor control processor ("MCP") 124. The ETAS ETK driver 122 allows the host PC 110 to directly read from and write to the MCP's 124 memory. This way, the Id and Iq current commands can be set and calibration tables can be populated by the host PC 110 (discussed below). In addition, torque feedback can be readout from the MCP 124. The MCP 124 includes control code, pulse width modulation (PWM) commands and input/output (I/O) capabilities to control the Id and Iq current and torque of the traction motor 140 and for receiving the observed torque from the transducer 142. The Dyno PC 130 includes a speed control application 132 for regulating the Dyno machine 144 to e.g., a constant speed below the traction motor's 140 rated speed.

The system 100, particularly the host PC 110, is used to execute the processing 200 illustrated in FIGS. 3 and 4 (described below in more detail) using MATLAB scripts. As is described more in detail with respect to FIGS. 3 and 4, a fitness function for fixed current values is used in the disclosed method 200 to automatically generate a maximum torque per ampere trajectory in a much more advantageous manner than today's IPM motor control mechanisms. The fitness function is defined as:

$$\text{Maximize } J_I = \text{Mean}\left\{\sum_{t=0}^{1s} \left(\frac{T_{measured}(t)}{I}\right)\right\} \quad (3)$$

Where $J_I$ is the fitness function for fixed values of the current I and $T_{measured}(t)$ is the sample of the steady state torque measured at time 't' observed by the torque transducer 142 (i.e., the observed torque illustrated in FIG. 2).

The current phase angle a will be the variable to be optimized and is constrained as follows:

$$\alpha_{min} \leq \alpha \leq \alpha_{max} \quad (4)$$

Where $\alpha_{min}$ is the minimum value of the current angle and $\alpha_{max}$ is the maximum value to be considered during the optimization.

As is discussed below, an optimal value of a is found for each value of the current I, in increments of $\Delta I$. The current range is constrained as follows:

$$I_{min} \leq I \leq I_{max} \quad (5)$$

Where $I_{min}$ is the minimum current magnitude and $I_{max}$ is the maximum current value determined by the inverter and the motor's maximum current ratings.

"Particle swarm optimization" is a robust stochastic optimization technique. It is based on the movement and intelligence of animals exhibiting swarm behavior. The swarm consists of group of particles moving within a search space, looking for a best fitness value $J_I$ (i.e., Equation (3)). Each particle moves with adjustable velocity $V_I$ (shown below in Equation (6)). Each particle in the PSO technique remembers the position where it reached its best fitness value so far, referred to as "pbest" (personal best). The swarm particles cooperate with each other and exchange information about its fitness value and position. Each particle tracks the best value obtained by its neighbor particles referred to as "gbest" (global best). At each iteration, each particle adjusts it velocity and moves to a new position.

Velocity adjustment (Equation (6)) is the sum of the current velocity, a weighted random vector in the direction of its personal best and a weighted random vector in direction of the global best.

$$V_i^{k+1} = w*V_i^k + C_1*\text{rand}_1*(pbest - X_i^k)C_2*\text{rand}_2*(gbest - X_i^k) \quad (6)$$

Where $V_i^{k+1}$ is the velocity of particle 'i' at iteration 'k'; w is a weighting function; $C_1$, $C_2$ are weighting factors known as cognitive and social factors, respectively; $rand_1$, $rand_2$ are uniformly distributed random numbers between 0 and 1; $X_i^k$ is the current position of particle 'i' at iteration 'k'; pbest is the best position achieved by the particle 'i' so far; and gbest is the best position achieved by group of particles so far.

The new position of each particle is determined by simply adding its old position to its new velocity as shown below in Equation (7).

$$X_i^{k+1} = X_i^k + V_i^{k+1} \tag{7}$$

As will be discussed below, to find the maximum torque output for a specific current magnitude, the method 200 disclosed herein uses a set of finite iterations to command sets of current phase angles (i.e., particles), and measures the corresponding torque responses from the dynamometer. At each iteration, the current magnitude is held fixed while a set of angles are commanded and the resulting torque outputs at each point are observed. Before the next iteration, the fitness function (mean of torque samples collected) is evaluated and the set of phase angles is adjusted to seek the point of maximal torque output. In this manner, the method 200 actively adapts the current magnitude vector command until the optimal phase angle for the specific magnitude is found. Once the phase angle has been optimized, the method 200 moves on to the next current magnitude and repeats the process.

In practice, the disclosed method 200 is used to determine the MTPA trajectory for an IPM motor in real time. To do so, however, it is necessary to modify the value of the motor controller's current vector command (i.e., the magnitude I and phase angle α) and observe the measured torque values in real-time from the host PC 110 executing the method 200. This is all done from the host PC's 110 MATLAB workspace 114. The INCA-MIP 112 provides an interface between the MATLAB workspace 114 and the motor control processor 124. Torque is measured by the torque transducer 142 and the values are captured by the motor control processor 124 and stored in its memory. The torque value is then read from the memory by the INCA-MIP 112 and stored in the MATLAB workspace 114. Similarly, current vector commands are issued to the processor 124 via the INCA-MIP 112 interface by writing directly to the processor memory.

Finally, the obtained MTPA trajectory is used to populate a calibration look-up table in the control processor memory for the optimal current vector. It should be appreciated that this optimization process could be embedded within the control processor; however, doing so would introduce extra computational burden on the control processor and is not preferred.

Figure 3:
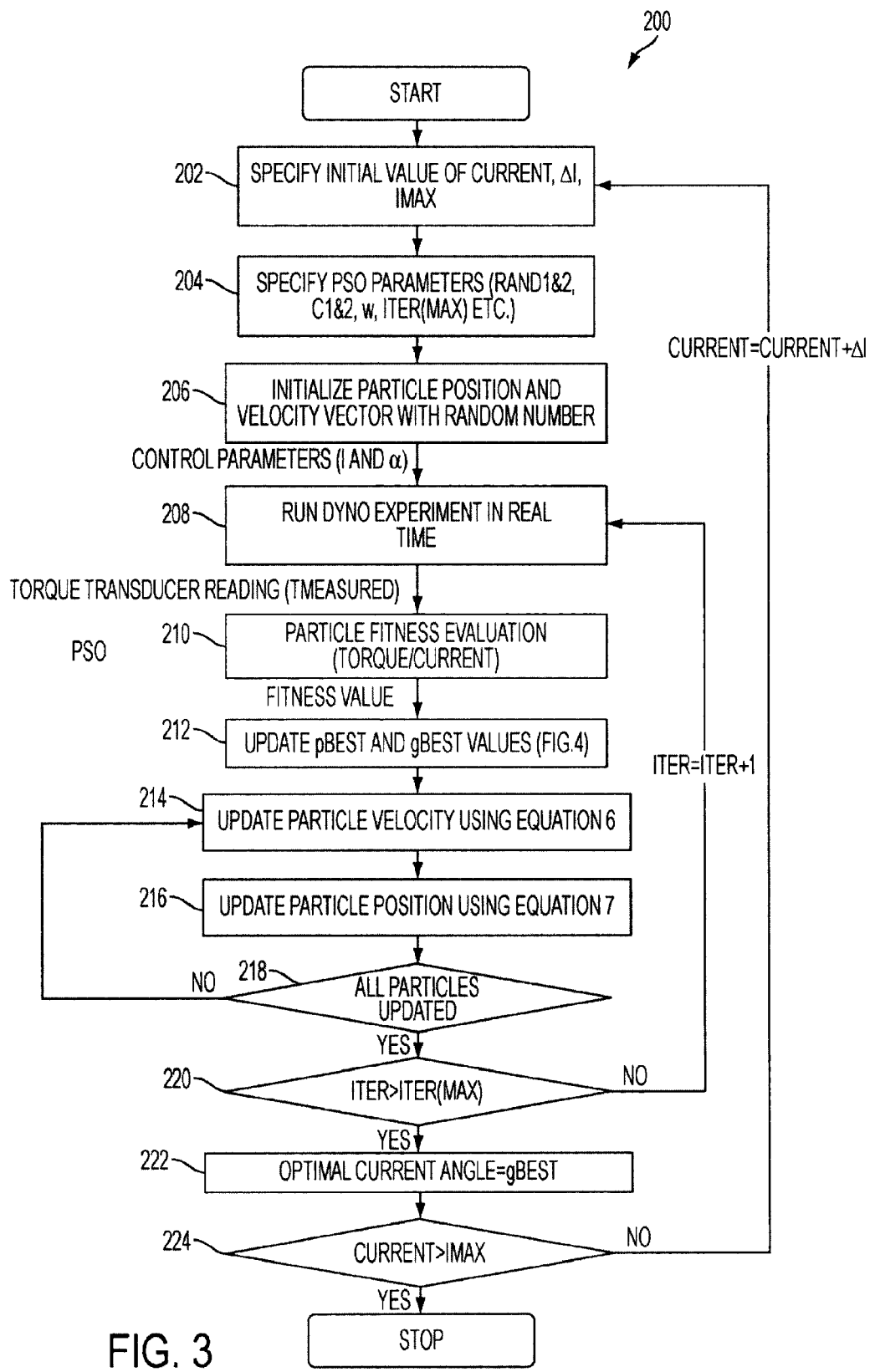
FIG. 3 is a flowchart of a method of automated maximum torque per ampere trajectory generation to be used for interior permanent magnet (IPM) motors in accordance with an embodiment disclosed herein.

Referring to FIG. 3, the method 200 begins by setting initial values of the current magnitude I, change in current ΔI, and the maximum current $I_{max}$ (step 202). The values of the current magnitude I, change in current ΔI, and the maximum current $I_{max}$ will depend on the inverter and specifications of the IPM motor being controlled. At step 204, the Equation (6) PSO parameters $C_1, C_2$, $rand_1$, $rand_2$, and w are initialized. A present iteration 'Ier' variable and a maximum iteration variable 'Iter(max)' are also initialized at this step.

The following are example values for the parameters that were determined based on simulations with an IPM motor having a maximum current $I_{max}$. For the first iteration k=1, the cognitive factor C1 is set to 2.5; the social factor C2 is set to 1.5; and the weighting factor w is set to 1. For iteration number k greater than or equal to 2 until k is equal to the maximum iteration "kmax", C1(k) is set to C1(k−1)-δC1; C2(k) is set to C2(k−1)-δC2, where δC1 is 1/(kmax−1) and δC2 is −1/(kmax−1); w(k) is set to w(k−1)-δw, where δw is 0.9/(kmax−1); rand1 and rand2 are random values drawn from a uniform distribution on the unit interval [0,1]; the maximum number of Iterations kmax=10; and the number of particles in each iteration is 10.

At step 206, the particle position X and velocity vector V parameters are initialized with random numbers. Step 206 will also output control parameters I and α. At step 208, the dynamometer experiment is run, resulting in a torque transducer reading ($T_{measured}$). A particle fitness evaluation (i.e., Equation (3) torque and current) is then made at step 210. The method 200 continues by updating the pbest and gbest values at step 212 (discussed in more detail below with respect to FIG. 4).

Step 214 updates the particle velocity $V_i^{k+1}$ (Equation (6)) using the updated information and step 216 updates the particle position $X_i^{k+1}$ (Equation (7)). Step 218 determines if all particles have been updated. If it is determined that all of the particles have not been updated, the method 200 continues at step 214, where steps 214 and 216 are repeated for the next particle. If step 218 determines that all of the particles have been updated, the method 200 continues at step 220, where it is determined if the present iteration Iter is greater than the maximum iteration Iter(max). If at step 220 it is determined that the present iteration Iter is not greater than the maximum iteration Iter(max), the method 200 increments the present iteration Iter and continues at step 208 (described above).

If at step 220 it is determined that the present iteration Iter is greater than the maximum iteration Iter(max), the method 200 continues at step 222, where the optimal current angle is set to gbest. At step 224 it is determined if the current magnitude I is greater than the maximum current $I_{max}$. If at step 224 it is determined that the current magnitude I is not greater than the maximum current $I_{max}$, the method 200 increments the current magnitude by ΔI and continues at step 202 (described above). Otherwise, the method 200 is completed.

Figure 4:
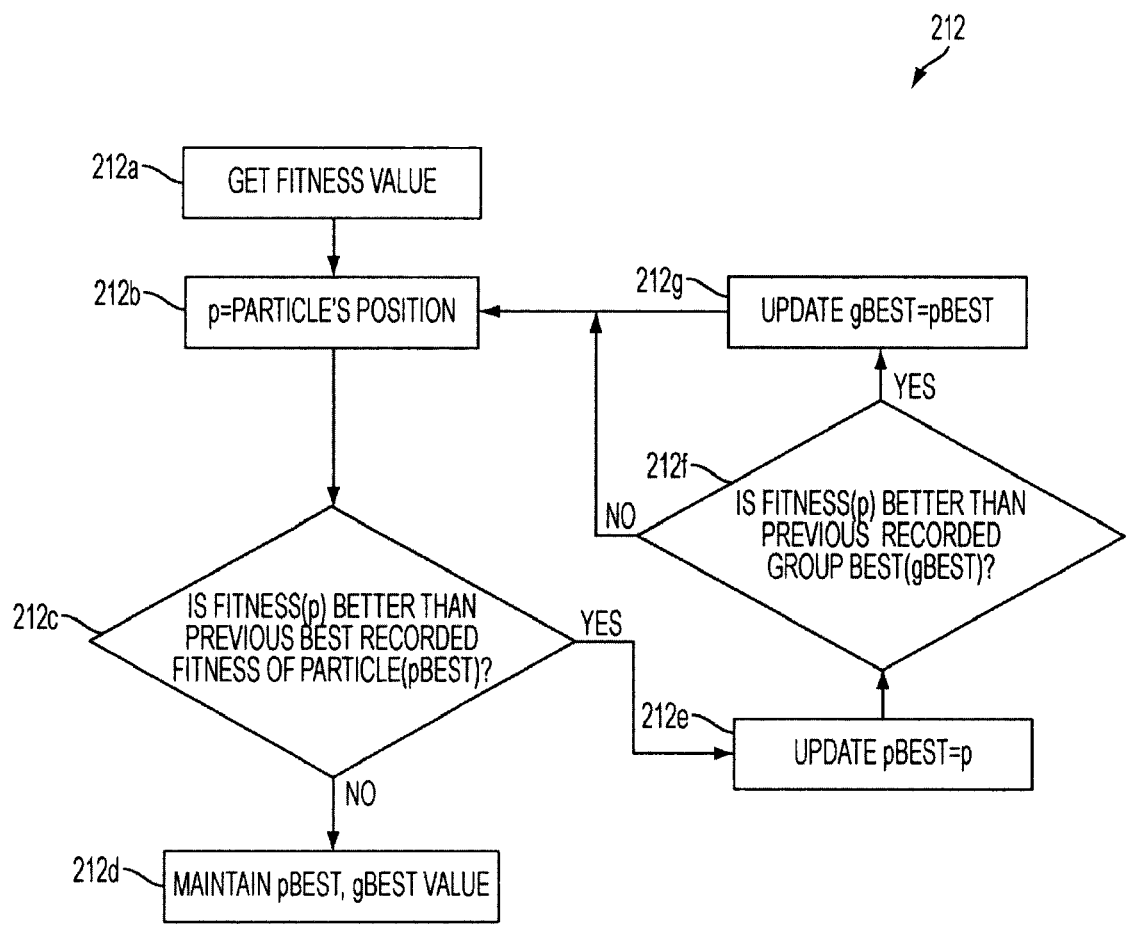
FIG. 4 is a flowchart of processing to determine best particle position and the best position of a group of particles used by the FIG. 3 method.

Referring now to FIG. 4, the process of updating pbest and gbest (step 212) is now discussed in more detail. Step 212a inputs the fitness value determined at step 210. A local variable p is set to the particle's position $X_i^{k+1}$ at step 212b. Step 212c determines if the fitness value for particle p is better than the best recorded fitness value for particle pbest. If it is determined that that the fitness value for particle p is not better than the best recorded fitness value for particle pbest, the process 212 continues at step 212d where the present pbest and gbest values are maintained (step 212 is completed).

If, however, it is determined at step 212c that that the fitness value for particle p is better than the best recorded fitness value for particle pbest, the process 212 continues at step 212e, where pbest is set to the particle p. Step 212f determines if the fitness value for particle p is better than the best recorded fitness value for the group gbest. If it is determined that that the fitness value for particle p is not better than the best recorded fitness value for the group gbest, the process 212 continues at step 212b (described above). If, however, it is determined at step 212f that that the fitness value for particle p is better than the best recorded fitness value for the group gbest, the process 212 continues at step 212g, where gbest is set to pbest.

The disclosed system 100 and method 200 provide several advantages over the known MTPA schemes discussed above. The disclosed method 200 does not need to estimate values of the d-axis inductance Ld, q-axis inductance Lq, permanent magnet flux $\phi_{mag}$ and other motor parameters, which is very cumbersome and time consuming task. The present method 200 can be used for any motor (even if it's parameters are unknown). In addition, there are no injections of the additional pulsating current signal, which is currently done in existing MTPA schemes. This means that the present system 100 and method 200 do not incur additional copper losses, noise, vibration and torque pulsation.

Using the disclosed system 100 and method 200, the MTPA trajectory can be obtained quickly and without the need to manually inject different current vectors at different angles to find the maximum torque. The current phase angle accuracy can be improved further, depending on the application's requirements, by increasing the number of iterations and decreasing tolerance in successive fitness values to decimal values. The disclosed method 200 is only limited by the accuracy of the torque sensor (i.e., transducer 142), and its accuracy can be increased by using more precise and accurate torque sensors.

Furthermore, the disclosed method 200 is less likely to get stuck in local minima/maxima as compared to other derivative based optimized MTPA schemes due to its stochastic nature. The disclosed technique can significantly reduce MTPA control algorithm development time and calibration time, which is extremely desirable. In addition, the optimization portion of the method 200 resides in a HOST PC 110 and does not result in an extra computational burden on the processor 124, and at the same time can be used in real-time. Moreover, any other function related to IPM control, and associated variables, can be added to the existing optimization method and optimized, providing additional flexibility and functionality not available in the prior art.

What is claimed is:

1. A method of calibrating a motor controller used to control an interior permanent magnet (IPM) motor for a vehicle, said method comprising:
    setting a current magnitude value for a current of the IPM motor;
    measuring a torque of the IPM motor;
    determining a maximum torque per ampere trajectory point for the IPM motor based on optimizing a current phase angle using particle swarm optimization; and
    repeating said current setting step to said maximum torque per ampere trajectory point determining step for a predetermined number of current magnitude values to create a maximum torque per ampere trajectory curve.

2. The method of claim 1, wherein the maximum torque per ampere trajectory curve is stored in a memory device of the motor controller.

3. The method of claim 1, wherein said maximum torque per ampere trajectory point determining step comprises:
    determining a present particle fitness value based on the current magnitude value and torque;
    updating best particle position and best global position values based on the present particle fitness value;
    updating particle velocity and particle position based on the updated best particle position and best global position values;
    repeating said current setting step to said particle velocity and particle position setting step for a predetermined number of particles; and
    setting an optimal current angle for the current magnitude value based on the best global position value.

4. The method of claim 3, wherein said step of updating the best particle position and best global position values comprises:
    updating the best particle position value to a current particle position if the present particle fitness value is better than a previous particle fitness value; and
    updating the best global position value to the best particle position if the present particle fitness value is better than a previous global fitness value.

5. The method of claim 3, wherein the particle fitness value is determined by the equation:

$$\text{Maximize } J_1 = \text{Mean}\left\{\sum_{t=0}^{1s}\left(\frac{T_{measured}(t)}{I}\right)\right\},$$

where $J_1$ is the fitness function, I is the current value and $T_{measured}(t)$ is the measured torque measured at time t.

6. The method of claim 1, wherein said step of setting the current magnitude value comprises:
    determining the current magnitude value at a host computer; and
    issuing a current setting command at an inverter connected to the IPM motor.

7. The method of claim 6, wherein said step of measuring the torque of the IPM motor comprises inputting a measured torque value from a torque sensor connected between the IPM motor and a dynamometer motor.

8. The method of claim 7, further comprising the step of setting a speed of the dynamometer motor to a speed below a rated speed of the IPM motor.

9. A system for calibrating a motor controller used to control an interior permanent magnet (IPM) motor for a vehicle, said system comprising:
    an inverter comprising the motor controller and being connected to control the IPM motor;
    a dynamometer controller connected to a dynamometer machine;
    a torque sensor connected between the IPM motor and the dynamometer machine; and
    a host computer, said host computer coupled to the inverter and being programmed to:
    set a current magnitude value for a current of the IPM motor;
    input a measured a torque of the IPM motor from the torque sensor;
    determine a maximum torque per ampere trajectory point for the IPM motor based on the current magnitude value using a real-time particle swarm optimization; and
    repeat said current setting step to said maximum torque per ampere trajectory point determining step for a predetermined number of current magnitude values to create a maximum torque per ampere trajectory curve until a maximum motor current is reached.

10. The system of claim 9, wherein the host computer causes said maximum torque per ampere trajectory curve to be stored in a memory device of the motor controller.

11. The system of claim 9, wherein said maximum torque per ampere trajectory point is determined by:
    determining a present particle fitness value based on the current magnitude value and torque;
    updating best particle position and best global position values based on the present particle fitness value;
    updating particle velocity and particle position based on the updated best particle position and best global position values;
    repeating said current setting step to said particle velocity and particle position setting step for a predetermined number of particles; and
    setting an optimal current phase angle for the current magnitude value based on the best global position value.

12. The system of claim 11, wherein updating the best particle position and best global position values comprises:

updating the best particle position value to a current particle position if the present particle fitness value is better than a previous particle fitness value; and updating the best global position value to the best particle position if the present particle fitness value is better than a previous global fitness value.

13. The system of claim 11, wherein the particle fitness value is determined by the equation:

$$\text{Maximize } J_I = \text{Mean}\left\{\sum_{t=0}^{1s}\left(\frac{T_{measured}(t)}{I}\right)\right\},$$

where $J_1$ is the fitness function, I is the current value and $T_{measured}(t)$ is the measured torque measured at time t.

14. The system of claim 9, wherein the current magnitude value is set by:
determining the current magnitude value; and
issuing a current setting command at said inverter.

15. The system of claim 9, wherein a speed of the dynamometer machine is set to a speed below a rated speed of the IPM motor.

\* \* \* \* \*